(12) United States Patent
Dudley et al.

(10) Patent No.: US 7,097,673 B2
(45) Date of Patent: Aug. 29, 2006

(54) COATING EDGE CONTROL

(75) Inventors: William R. Dudley, Geneseo, NY (US); Alan P. Miller, Woodbury, MN (US); Robert A. Yapel, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 249 days.

(21) Appl. No.: 09/876,567

(22) Filed: Jun. 7, 2001

(65) Prior Publication Data

US 2002/0197535 A1 Dec. 26, 2002

(51) Int. Cl.
*H01M 4/04* (2006.01)
*H01M 2/08* (2006.01)
*H01M 2/14* (2006.01)
*H01M 4/66* (2006.01)
*B05D 5/00* (2006.01)
*H01M 10/40* (2006.01)

(52) U.S. Cl. .................... 29/623.5; 429/245; 429/246; 429/185; 427/286

(58) Field of Classification Search ................ 429/246, 429/247, 249; 118/667, 679; 427/58, 71, 427/286; 29/623.5
See application file for complete search history.

(56) References Cited

U.S. PATENT DOCUMENTS

| | | | |
|---|---|---|---|
| 3,899,355 A | 8/1975 | Chiklis | |
| 4,019,906 A | 4/1977 | Ridley | |
| 4,303,708 A | 12/1981 | Gebhardt et al. | |
| 4,324,816 A | 4/1982 | Landis et al. | |
| 4,521,359 A | 6/1985 | Tsien | |
| 4,758,483 A | 7/1988 | Armand et al. | |
| 5,275,750 A | 1/1994 | Sato et al. | |
| 5,360,684 A | 11/1994 | Duval et al. | |
| 5,516,273 A | 5/1996 | Delmore et al. | |
| 5,620,811 A | 4/1997 | Zhang et al. | |
| 5,639,305 A | 6/1997 | Brown et al. | |
| 5,688,615 A | 11/1997 | Kao et al. | |
| 5,701,055 A * | 12/1997 | Nagayama et al. | 313/504 |
| 5,755,985 A | 5/1998 | Vallee et al. | |
| 5,759,274 A | 6/1998 | Maier et al. | |
| 5,888,672 A | 3/1999 | Gustafson et al. | |
| 5,894,656 A * | 4/1999 | Menon et al. | 29/623.1 |
| 5,997,645 A | 12/1999 | Grimmel et al. | |
| 6,013,393 A | 1/2000 | Taniuchi et al. | |
| 6,025,096 A | 2/2000 | Hope | |
| 6,030,728 A | 2/2000 | Cotte et al. | |
| 6,051,297 A * | 4/2000 | Maier et al. | 428/56 |
| 6,159,544 A * | 12/2000 | Liu et al. | 427/286 |
| 6,244,208 B1 | 6/2001 | Qiu et al. | |
| 6,280,883 B1 | 8/2001 | Lamanna et al. | |

(Continued)

FOREIGN PATENT DOCUMENTS

EP 0610255 8/1995

(Continued)

*Primary Examiner*—Jonathan Crepeau
(74) *Attorney, Agent, or Firm*—Daniel R. Pastirik; Dean M. Harts

(57) ABSTRACT

Described are methods and products prepared from the methods, each of which include methods of coating certain materials onto a substrate, including coating a coating material and an edge material onto the substrate in a manner which may provide an improved thickness profile of the overall coating, and that may do so by using the edge material to augment the thickness of the coating material edge, or that may do so by improving the coating material edge by using the edge material to affect the shape of the coating material edge, the products being useful, for example, in electrochemical cells.

31 Claims, 8 Drawing Sheets

U.S. PATENT DOCUMENTS

| | | | |
|---|---|---|---|
| 6,317,185 B1 * | 11/2001 | Harano et al. | 349/147 |
| 6,458,490 B1 * | 10/2002 | Hommura et al. | 429/231.1 |
| 6,488,721 B1 * | 12/2002 | Carlson | 29/623.5 |
| 6,521,382 B1 * | 2/2003 | Song et al. | 429/309 |
| 2002/0037458 A1 * | 3/2002 | Yamaguchi et al. | 429/338 |

FOREIGN PATENT DOCUMENTS

| | | |
|---|---|---|
| WO | WO 95/29763 | 11/1995 |
| WO | WO 95/29764 | 11/1995 |
| WO | WO 95/29765 | 11/1995 |

* cited by examiner

COATING EDGE CONTROL

FIELD OF THE INVENTION

The invention relates to coating methods that include techniques of controlling edge thickness and profile, and products prepared from those methods.

BACKGROUND

Coated webs are used in a multitude of commercial and consumer products. A single example is batteries, some of which are constructed from a web coated with a conductive material and wound into a roll or stacked into a number of laminated layers. See, e.g., U.S. Pat. No. 5,360,684, among others.

Films coated onto webs often suffer from different thickness across the width of the film, especially at the coated film edge. If no effort is made to control the thickness or cross-sectional profile of the edge, an edge of a coated material will generally taper off in a gradual slope from the thickness of the bulk coating, to zero thickness.

Undesirable results of a tapered edge will result with the particular effect being dependent on the application that the coated material is designed for. In batteries constructed of multiple wound or stacked layers, undesirable possibilities of an uneven or tapered edge result upon placing the coated substrates into a layered configuration. An "edge effect" can result because the capacity of the tapered edge of a coated cathode is used up faster than the capacity of the bulk coating. This edge effect results in a non-uniform charge density, may cause hot-spots or shorts in the battery, and can ultimately result in a reduced cycle life.

Methods of attempting to control edge thicknesses and profiles are various, some including the use of dams or air or water systems designed to remove a coated film layer from a coated substrate.

SUMMARY OF THE INVENTION

The invention involves methods of applying a coating material onto a substrate, especially where the edge of the coating material has a desirable shape or thickness profile.

The term "thickness profile" refers to the thickness, as viewed from the side (i.e., a cross-section directed along the machine direction) of materials coated on a surface of a substrate, and is used herein to reference coating thickness at a coating material edge. The thickness profile of coatings of a coating material edge partially or completely coated over with edge material is based on the total thickness of the coating material and the edge material. Where only the coating material is coated on an area of a substrate, the thickness profile is taken as the thickness of the coating material alone.

An "improved thickness profile" is a thickness profile that provides some improvement or advantage relative to a thickness profile that is produced without using an edge material in a manner described herein. Preferably, the invention allows a thickness that is relatively uniform at the edge of a coated coating material. Examples of improved thickness profiles include the thickness profiles of coating material edges shown in FIGS. 1a, 5 and 10.

Improved thickness profiles at an edge of a coated coating material can be produced using an edge material coated adjacent to and in contact with the coating material. The edge material may augment or coat over the edge of the coating material to provide a uniform total thickness of materials along the coating material edge. Alternatively, with some of the coating techniques described herein, the edge material may affect the actual shape of the coating material edge, causing the edge of the coating material itself to form an improved shape with a desirable thickness profile (with or without augmentation of the thickness using the edge material). Such an "improved edge" can be an edge that has an improved shape relative to a typical, relatively wide taper produced without the use of an edge material, especially an edge having a more narrow width or a steeper slope relative to an edge of a coating material coated without the use of an edge material.

The edge material may be coated prior to the coating material, the coating material may be coated prior to the edge material, or the two materials may be coated substantially simultaneously or simultaneously.

In one embodiment of the invention, a coating material coated on a substrate exhibits a tapered edge. According to the invention, edge material is coated to contact the edge of the coating material to augment the thickness at the coating material edge and produce a desired thickness profile at the edge based on the combined thickness of the coating material and the edge material. Advantages result from the uniform thickness profile, e.g., a thickness profile that is uniform to within 10%, or 5% variation. For instance, when the coated substrate is wound, it winds evenly in the region of the coating material edge as opposed to uneven winding if the edge has an uneven thickness profile.

In another embodiment, an edge material can be used as a physical boundary against which coating material is coated, to form a desired coating material edge and a desired thickness profile at the coating material edge. The edge material and the barrier material are preferably immiscible. The result can be an improved thickness profile at the edge of the coating material, including an improved shape of the coating material edge. This embodiment can also improve winding of the coated material in the region of the coating material edge, due to an improved thickness profile. This embodiment not only covers up a tapered coating material edge, but can in fact work to improve the shape of the edge and the thickness profile at the edge of the coating material itself.

Covering up coating material edge causes the covered coating material to become non-functional and essentially wasted. Ideal coating techniques would allow a coated edge of a coating material to contact a coated edge of an edge material, with the two edges taking the form of square edges at their interface which do not taper or overlap. (See, e.g., FIG. 4.) Or, it can also be useful to simply reduce the amount of coating material that ends up constituting an edge, e.g., by increasing the slope and decreasing the width of the tapered edge and thereby reducing the amount of coating material wasted as the edge. (See, e.g., FIG. 5.) According to certain embodiments of the inventive method, coating conditions and edge materials and coating materials can be chosen to result in a coating material edge that is less tapered as measured by the slope of the tapered edge. The more steep the coating material edge, the less coating material is wasted, so steep coating material edges can be preferred.

When used to prepare products having a wound or stacked construction, the method of the invention can allow for coating processes that give a uniform thickness profile at the edge of the coating material. This can give manufacturing efficiencies relative to winding the substrate with an uneven edge or relative to other methods of dealing with the uneven edge. Compare, for example, U.S. Pat. No. 5,360,684, which describes methods of preparing stacked battery constructions.

In a specific application of the invention, the coating material can be a cathode material. The edge material can be used to improve the shape of the cathode material edge or to cover a tapered cathode material edge, leveling the overall thickness of the coated materials at the cathode material edge and facilitating winding or stacking to form a product with desired edge properties. The edge material can optionally and preferably be chosen to perform a desired function in the wound or stacked product construction, such as a barrier to moisture, water, or light, and can also optionally and preferably be an insulating material.

A specific embodiment of a battery component produced using the method of the invention can have a cathode material edge in contact with an insulating edge material. The insulating edge can act as a barrier to light, water, or other debris, etc. Alternatively or in combination, the insulating edge material can prevent the free edge of a current collector or anode from contacting a different component of a stack, potentially causing a short circuit. The insulating edge material serves the purpose of insulating components of the battery product, and is very adaptable to high-speed manufacturing. Insulating components of the stack from electrical contact can prevent undesired effects such as current density variations and shorts that might otherwise occur, e.g., following winding.

An aspect of the invention relates to a method of coating a substrate with a cathode material for an electrochemical cell. The method generally includes steps of providing a substrate, coating edge material onto the substrate, and coating cathode material onto the substrate. The coating material and the edge material contact each other, and the thickness profile at the edge of the coated cathode material is improved relative to a thickness profile of an edge of a cathode material coated without the edge material.

Another aspect of the invention relates to a method of coating a substrate with a coating material. The method generally includes steps of providing a substrate, coating non-viscoelastic, polymer-containing, electrically insulating, edge material onto the substrate, and coating a coating material onto the substrate. The coating material and edge material contact each other, and the thickness profile of the coating material edge can be improved relative to a thickness profile of a coating material edge produced without the edge material.

Another aspect of the invention relates to a method of coating a substrate with a coating material. The method generally includes providing a substrate, coating edge material onto the substrate using a coater that is a slotted die coater and that is not a curtain coater, and using the same slotted die coater to coat a coating material onto the substrate. The edge material and the coating material contact each other, and the thickness profile of the coating material edge is improved relative to a thickness profile of a coating material edge produced without the edge material.

Yet another aspect of the invention relates to a method of preparing a battery cathode. The method includes providing a substrate, using a slotted die coater to coat a cathode material onto the substrate, and from a second slot of the same die coater, coating edge material onto the substrate, wherein the coating material and the edge material are in contact at their respective edges.

Yet a further aspect of the invention relates to a method of coating a substrate with a cathode material for an electrochemical cell. The method includes providing a substrate, coating a cathode material onto the substrate, and coating an insulating edge material onto the substrate. The edge material acts as a barrier, and the coating material and the edge material contact each other. The insulating edge material can also act to insulate layers of a stacked battery component from each other, e.g., to insulate an anode from a current collector by preventing electrical contact between them.

Still a further aspect of the invention relates to a battery component that includes an anode, a separator having a surface adjacent to a surface of the anode, a cathode having a surface adjacent to another surface of the separator, an edge material contacting an edge of the cathode, and a current collector contacting the cathode. The edge material acts as a barrier material to protect the edge of the cathode.

Figure 1:
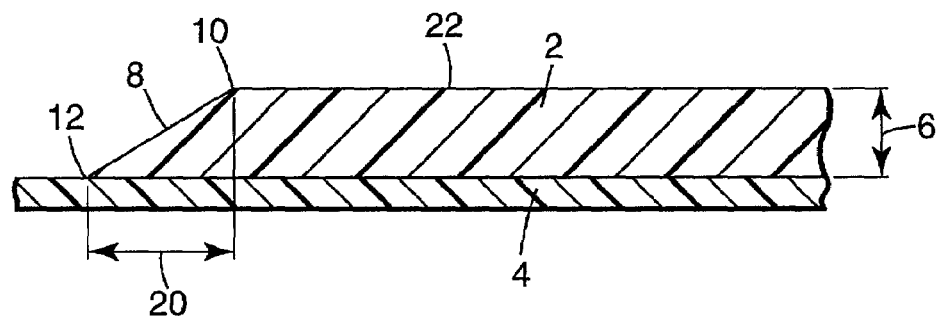
FIG. 1 is a side view illustration, in a machine direction, of a typical coating of a coating material, having a tapered edge.

All of the figures are not shown to proper scale.

DETAILED DESCRIPTION

In general, the invention involves applying, e.g., coating, materials onto a substrate, including a coating material and an edge material, with the two materials being adjacent to and contacting each other. In some preferred embodiments of the invention, the coating methods can result in a desired thickness profile at the edge of the coating material, optionally including a desired shape of the coating material edge effected by the coating technique.

In comparison to a tapered thickness profile at the edge of a coated film produced by conventional coating methods, the invention can be used to augment the thickness of the tapered edge with an edge material, giving a thickness profile of the combined materials that facilitates subsequent processing and that can improve product construction or performance.

In certain embodiments, the invention allows a coating material and an edge material to be coated in such a way that the edge material affects the shape of the coating material edge and improves the shape, especially to form a narrower (i.e., less wide) edge with a steeper taper, and ideally to approximate or actually produce a square coating material edge. Accordingly, a desired thickness profile of the coating material edge can be formed by using the edge material as a physical boundary that contacts the coating material to form a coating material edge having a desirable shape and thickness profile, most preferably to form a coating material edge that has a relatively steep taper with a narrow width, or ideally, no width or taper at all.

The coatings may be performed using any of a number of coating and extrusion methods known to those skilled in the coating and extrusion arts, including rod, knife, blade, air knife, gravure, roll, slot, and extrusion coating (See for example "Modem Coating and Drying Technology", E. Cohen and E. Guhoff, 1992 VCH Publishers, pp. 5–9). (As used herein, the words "coat," "coating," "coated," and the like, will generally refer to all of these types of coating processes, including extrusion processes.) The materials that are coated may include solvent or not, solventless coatings being specific examples of extrusion coating processes.

Preferred coating methods of these or other types may be practiced according to the invention using a slotted die coater, optionally in the form of a solventless extrusion process. Such extrusion coating methods can include slot coating a solventless, relatively high viscosity coating or edge material onto a substrate with the slot or slots of a slot coating extrusion die being located a distance from the substrate such that the material being coated normally does not fill the gap between the lips of the coating head and the moving substrate. Extruded materials can be, e.g., plastic layers and hot melts, which are extruded and then pulled from the slot as a film by a moving web. Extrusion slot coating could be accomplished, for purposes of the invention, for example, via extrusion coating a cathode material onto a web, calendering, followed by slot coating, e.g., extrusion slot coating, hot melt edge material in contact with the edges of the coated cathode material, the placement of the edge material being controlled using shims placed in the slot coater. A solventless cathode material and methods of extrusion coating are described, for example, in Assignee's U.S. patent application Ser. No. 09/782748, entitled "Method for Making Electrode," filed Feb. 13, 2001, now U.S. Pat. No. 6,589,299 the entire disclosure of which is incorporated herein by reference.

The different materials coated on the substrate may be coated separately using different pieces of coating equipment at different locations. Or, the coating methods can be performed using a single piece of coating equipment that applies different materials onto different surface areas of a substrate, adjacent to one another, preferably in a continuous fashion, and preferably using equipment and techniques that allow stripe coating. In either case, useful equipment includes die coaters that have a die for material to flow through, where the material contacts a moving substrate upon exiting the die. Different types of die coaters are known, including slot die coaters that have one continuous slot for each material being fed through the die coater. Slot die coaters for use according to the invention can have one slot for coating a coating material situated near and parallel to a second slot for coating an edge material, and die-coater lips that can be located very near the moving substrate for application of the materials directly onto the substrate. The flow of each material through the respective slots onto different areas of the moving substrate can be controlled using shims, as will be appreciated.

An example of another type of die coater includes die coaters that approximate one or more continuous slots by a series of discontinuous but closely spaced orifices or holes that are of a size and spacing such that material can be fed through the series of holes onto a moving web to result in a uniform coating. (This type of coater is not considered to be a "slot" die or a "slotted" die coater, because it does not include a "slot" per se, or a continuous slot.) Each hole in the series of holes that approximates a slot is in communication with a single cavity to supply a material for coating through all of the holes at once. With these types of dies, flow through different portions of each of the series of discontinuous holes, i.e., to coat different areas of a web in a striped manner, can be controlled using a faceplate.

Preferred but not required are die coaters that have multiple manifolds and cavities that feed multiple slots or orifices to allow continuous coating of different materials from the different slots or orifices, but with the two materials being coated onto a substrate at nearly the same time. Examples of such multiple manifold and multi-orifice die coating apparatuses are described in PCT International Publication Number WO95/29763, the entire disclosure of which is incorporated herein by reference.

According to an embodiment of the invention, a coating material can be coated onto a substrate by conventional methods to produce a bulk coating of the coating material (having a desired thickness) and a coating material edge. The coating material edge will normally be uneven or tapered (see, e.g., FIGS. 1 and 1a). Edge material can then be coated to contact and at least partially cover the tapered coating material edge, resulting in a desired thickness profile for the combined materials.

Specifically, coating material can be coated to form a bulk area of coating material and a coating material edge. Edge material is then coated to contact and preferably at least partially cover the coating material edge, and typically to provide a small amount of a coating that is bulk edge material. When viewed as a cross section in a machine direction, there will be a first region of bulk coating material, a second region of tapered coating material edge covered at least in part by edge material, and a third region that is bulk edge material that also includes a tapered edge of coated edge material.

The thicknesses of the coating material and edge material can be any thicknesses that are desired. Of course, the thickness for any particular process will depend on the intended use of the coating material or the function of the edge material. Typical dry thicknesses of coated films can sometimes be in the range from about 1 to about 250 microns, but it will be understood that thicknesses outside of this range can also be achieved and may also be useful for various product embodiments.

The wet thickness is the thickness of the layer as coated but before any drying. This is directly related to flow rate, coating width, and web speed. The dry thickness is the caliper of the coated layer after drying to remove volatile solvents, if any. Most preferably according to the invention, the thickness of the first region of bulk coating material, the thickness of the region of bulk edge material, and the thickness of the region of tapered coating material edge covered with edge material, will all be approximately the same (especially when dry), to result in a continuous thickness profile across all three regions that is substantially uniform.

For battery materials prepared according to the invention, the coating material can be an active battery material such as a cathode material. The thickness of the coating material (cathode material) can be any thickness that allows functioning, e.g., as a cathode. Exemplary dry thicknesses of coated cathode materials can be in the range from about 3 microns to about 100 microns, with the range from about 10 microns to about 70 microns being preferred.

Necessarily, in those embodiments of the invention where coating material is coated to a tapered edge and edge material is coated to at least partially cover the tapered coating material edge, the coating material is coated at a time at least slightly prior to coating of the edge material. The difference in timing can be any time period, and can depend on the coating techniques used to apply the coating material and the edge material. For instance, the invention contemplates that a coating material may be coated by a conventional coating method onto a substrate (e.g., extrusion, solventless extrusion, or a solvent-based coating method), and then at a later time or even during a subsequent processing step, possibly using different equipment or a different coating station, and possibly with intervening process steps such as drying or calendering, edge material can be coated to augment the thickness of the edge. For example, a polypropylene edge material may be hot-melt coated at both edges of a previously-coated coating material. Also, depending on the timing and time differential between coating a coating material and an edge material, the first coated of the two, e.g., the coating material, may be partially or completely dried (if it contains solvent) before coating the second (e.g., edge) material.

In other embodiments of the invention, using certain coating techniques, the time differential between coating the coating material and the edge material can be relatively short, e.g., a matter of seconds, or fractions of a second.

Figure 1A:
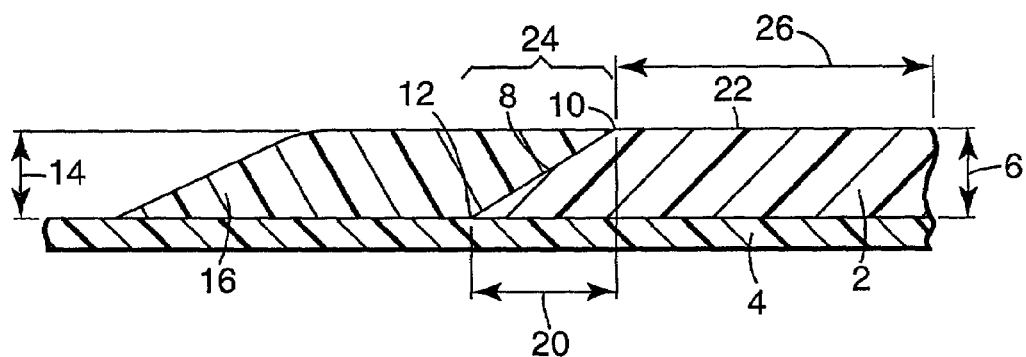
FIG. 1a illustrates the coating material of FIG. 1 further coated with an edge material to at least partially cover the tapered edge.

FIGS. 1 and 1a illustrate a coating material and edge material prepared according to the invention. The figures illustrate a coating material coated onto a substrate by any conventional method. The coated coating material includes a bulk coating of a desired thickness and having a tapered edge. In FIG. 1a, an edge material has been coated onto the tapered coating material edge to augment the thickness of the edge, resulting in a thickness profile of relatively uniform thickness across the edge of the coating material.

Referring now to the specific details of FIG. 1, it is a cross sectional view of a coated substrate, looking in the machine direction. The figure shows coating material 2 of a desired thickness 6 coated onto a substrate 4. Edge 8, with projected width 20, is the tapered coating material edge, extending generally from point 10 to point 12. Point 10 indicates the point where edge 8 meets the surface 22 of the bulk of coating material 2, having a desired thickness 6. Point 12 indicates the endpoint of coating material edge 8, where the thickness of coating material 2 goes to zero.

The slope of tapered edge 8 may be comparatively shallow. FIG. 1 shows that edge 8 has a width 20 (a dimension in the cross direction of the web), which may vary depending on the coating material, its thickness, and the techniques used to apply the coating material. For a coating material that is applied by conventional methods, such as by conventional die coating methods, to have a desired thickness 6 in the range from about 10 microns to about 70 microns, width 20 may typically be in the range of a few millimeters, e.g., about 1, 2, or 3 millimeters. (As described below, it is an advantage of certain embodiments of the invention that the degree of taper of edge 8 can be caused to be relatively steeper by using preferred coating techniques described herein. In those instances, the width 20 of a coating material edge can be reduced.) The width 20 of the edge of the coating material in FIG. 1 is not to scale relative to, e.g., the thickness 6 of the coating material.

Referring now to FIG. 1a, edge material 16 is coated to contact and at least partially cover tapered coating material edge 8. In the illustration, edge material 16 is ideally shown to substantially cover tapered edge 8. The combined thickness of the coating material edge 8 and edge material 16, across width 20, produces a desired, relatively uniform thickness profile 24 that uniformly approximates and preferably equals desired coating thickness 6. Also shown is the bulk of edge material 16 having a desired thickness 14, and including its own tapered edge.

This embodiment of the invention can be useful to improve the thickness profile of coating materials coated by conventional methods, by augmenting the thickness of the coating material edge. In some product constructions such as batteries it can be desirable that the thickness of the exposed amount of coated material be uniform. Referring again to FIG. 1a as an example, the exposed surface of coating material 2 has a uniform thickness 6 provided by the bulk of the coating material across the substrate, ending at point 10. In battery product constructions, the coated substrate will be wound or stacked into layers wherein the area of the coating material edge, beginning at point 10 and extending to the termination of edge material 16, will have the properties of the edge material 16. Edge material 16, when wound or stacked into a battery product component, can perform useful functions such as protecting the enclosed coating material 2, or acting as an insulator between components of the battery. As such, edge material 16 can be made up of material that accomplishes one or more of these functions, e.g., a barrier material, a non-active battery material, an insulating material, etc.

Still referring to FIGS. 1 and 1a, the coating material and the edge material can be applied to a substrate using any techniques and equipment that can produce the depicted arrangement of materials on a substrate. Many types of such equipment will be understood to be useful by a skilled artisan to continuously coat different materials onto a substrate with adjacent, contacting edges.

Preferred coating methods and equipment involve die coating methods (including extrusion methods by die-coating) and equipment that allow edge material and coating material to be continuously coated onto different areas of a substrate with their edges being in contact. Examples of equipment include dies that allow for the separate flow of coating material and edge material from different coating apparatuses. Also preferred can be equipment that allows for the separate flow of coating material and edge material from different orifices of a single coating apparatus, e.g., through separate but closely spaced slots of a single coating die that has the capacity to coat multiple flows of materials onto a single substrate.

A variety of multi-orifice coating apparatuses are known, including those described in WO95/29763, as well as multi-cavity coating apparatuses that include multiple closely spaced holes designed to approximate a continuous slot, and extrusion-coating dies. Specific examples include multi-slot dies having two or more continuous, substantially parallel slots, including those types referred to in the coating arts as dual slot extrusion dies, slot fed knife dies, and fluid bearing dies.

Figure 2A:
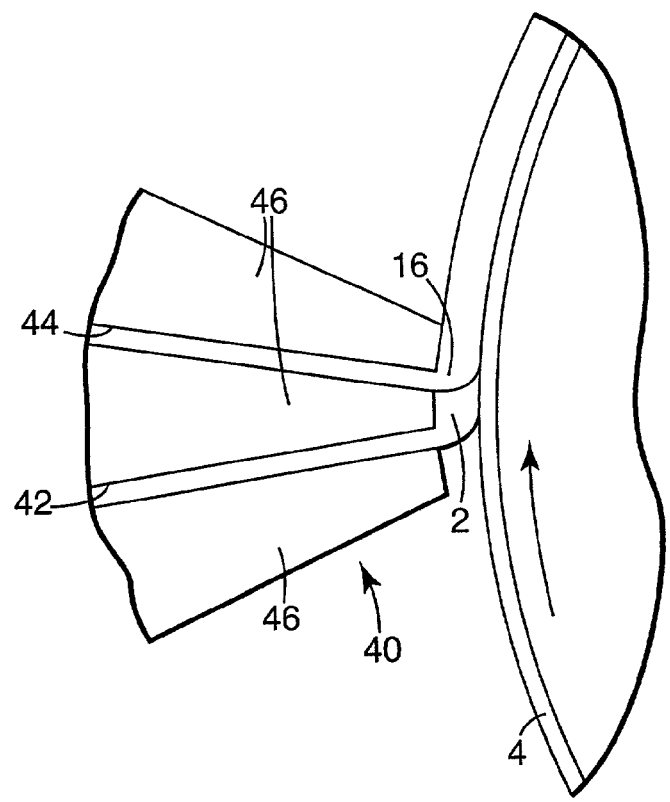
FIGS. 2a and 2b are side-view illustrations of exemplary die coating apparatuses useful to die coat a coating material and an edge material according to the invention.
Figure 2B:
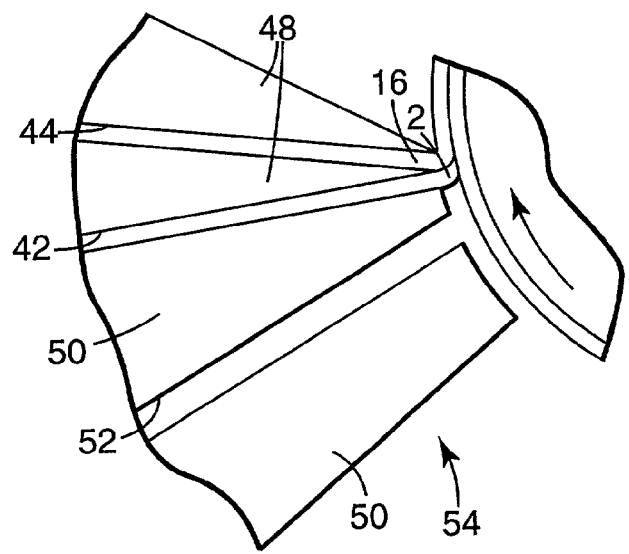

Examples of multi-orifice, multi-slot coating equipment are shown in FIGS. 2a and 2b. Referring specifically to FIG. 2a, it is a side view of a two-cavity, two slot dual extrusion die. Coating head 40 includes two channels, 42 and 44, defined by three separate members 46 which together define the channels 42 and 44, terminating at the end of the coating die or coating head, the end being sometimes referred to as the lip, and being placed in close proximity to the substrate during coating. Coating material 2 and edge material 16 flow through the channels for coating onto a substrate 4 while substrate 4 travels past coating head 40. Because FIG. 2*a* is a side view of the coating process, the figure illustrates coating material 2 first being coated onto substrate 4, and edge material 16 being coated second (but nearly simultaneously) and adjacent to and in contact with coating material 2.

As will be appreciated by those skilled in the arts of coating methods and coated materials, the exemplary coater head 40 of FIG. 2*a* and its structure and components can take alternative forms, as desired, and according to known principles. For instance, members 46 are illustrated in FIG. 2*a* to terminate in cornered tips. One or more of these tips may instead be pointed or rounded. Different embodiments of these coater heads are known by a variety of names in the coating arts, such as, very generally, "dual extrusion dies," or more specifically as "slotted knife," or otherwise. FIG. 2*b*, for example, shows a coater head 54 that includes pointed members 48 and rounded members 50, the combination of which defines channels 42 and 44, for coating material and edge material. Rounded members 50 further define channel 52, which in this coater can be used to pull vacuum from substrate 4 prior to coating coating material 2 and edge material 16.

Figure 3:
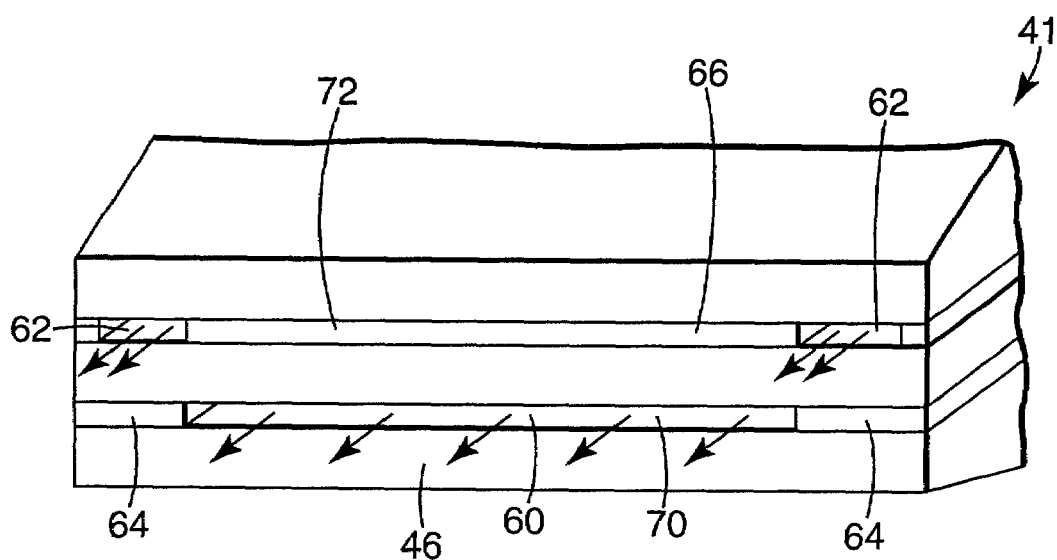
FIG. 3 is an end view of an exemplary die coating apparatus for use according to the methods of the invention.

FIG. 3 is a front view of a coater head 41. Looking at FIG. 3, it illustrates how coating material 2 and edge material 16 can be applied to different areas of a substrate moving past the coater head 41. In general, this is accomplished by using coating equipment having multiple manifolds for coating different materials, with the different manifolds coating different areas or "stripes" onto a moving substrate. According to the invention, the edges of the different stripes contact each other when applied to a substrate.

As illustrated in FIG. 3, selectively coating different areas of a moving substrate can be accomplished by selectively preventing coating material from flowing out of selected portions of one orifice (here a slot) of a coater head, while allowing flow of edge material from the corresponding portion of the other slot, and vice versa. Referencing FIG. 3, shims are placed at portions 64 of slot 70, and at portion 66 of slot 72. This will prevent coating material 2 from being coated onto a substrate surface moving past portions 64, but allow coating of the coating material at portion 60. Conversely, a shim at portion 66 of slot 72 prevents coating of edge material where coating material has been coated from portion 60 of slot 70, and edge material flows from portions 62 of slot 72, to place edge material on substrate surfaces where no coating material is coated because of shims 64 in slot 70. The overall effect provides a complementary system of coating edge material 16 and coating material 2 onto different areas of a substrate 4 traveling past coating head 40. As described above, the interface between an edge of the coated coating material 2 and the coated edge material 16 can have a desired, preferably uniform, thickness profile, preferably where the thickness of the material in bulk coating 2, the thickness of material at the coating material edge, and the thickness of the bulk coating of edge material, will be approximately the same when wet and/or dry, e.g., within 5 or 10 percent of each other.

As further description of embodiments of the invention, certain coating techniques can be used whereby edge material can be coated with coating material in a fashion such that the edge material acts as a boundary against which coating material is coated, optionally and preferably allowing the formation of an improved thickness profile of the edge of the coating material, e.g., with an improved edge shape having more squareness, less taper, and a narrower width.

The coating material can preferably be immiscible with the edge material at coating conditions such that the coating material forms an edge of a desired shape at the interface between the edge material and the coating material. "Immiscible" can refer to materials that form two identifiable phases when they come into contact with each other. As specifically used herein, two materials, i.e., coating material and edge material, coated onto a substrate as films contacting each other at their respective edges are considered to be immiscible if there is an identifiable separation between the two. Immiscibility of the materials can be affected by a number of factors that relate not only to the composition of the different materials, but that also relate to the overall coating environment and the coating techniques used. Thus, "immiscibility" is not an absolute function of the specific materials that are being considered. Instead, immiscibility can be environment-specific, also relating to environmental factors such as temperature and other conditions used in causing the different materials to interact. For example, the compositions of the materials can be selected to inhibit their miscibility. Composition can include both the chemical makeup of ingredients of materials and the amounts of different ingredients included in different materials (e.g., as measured by solids percentages). Other features of the materials that can also affect miscibility include temperature or viscosity of the different materials and the methods used to coat the different materials onto a substrate. Based on these factors, different or like materials can be immiscible materials, and environmental factors can allow different or like materials to maintain a separation when coated to contact each other. Some coating techniques can be particularly useful in coating materials onto a substrate while maintaining a separation between the materials. Such techniques include those that promote laminar flow of the materials and minimize turbulent interaction at the edges of the materials that come into contact. Differences in chemical composition, viscosity, temperature, flow rates, shim thicknesses, or slot overlap of separate stripes of materials being coated can also be used to encourage separation between the materials when coated to contact each other. Also, the respective coating thicknesses of each of the coated materials can affect the miscibility or otherwise influence the shape of the coating material edge. It can be preferred that the wet coating thicknesses of materials being coated are similar or approximately the same. For example, it can be preferred that the wet thicknesses of the edge material and the coating material, where the edge of the edge material contacts the edge of the coating material, are essentially the same, for example are within ten or five percent of each other.

Figure 4:
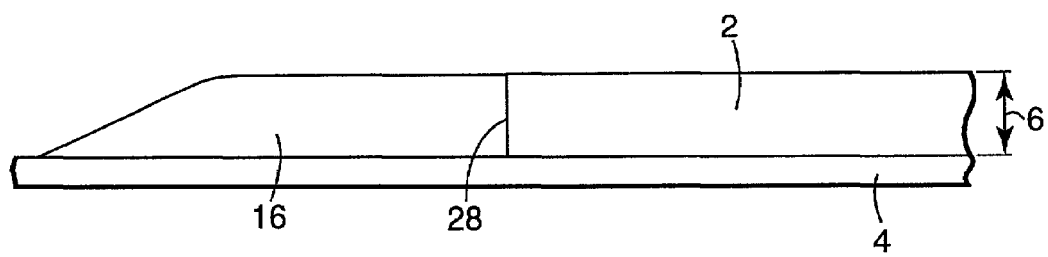
FIG. 4 is a side view illustration of a coating of coating material and edge material coated to an improved, approximately or exactly square edge for each material.

Referring now to FIG. 4, coating material 2 is coated adjacent to and in contact with edge material 16. The materials are immiscible as coated, so they do not substantially mix or combine, but preferably maintain substantial separation at interface 28.

FIG. 4 represents an idealized embodiment of square edges prepared according to the invention, where both materials exhibit approximately or perfectly square-cornered edges at interface 28, and the thickness profile across the bulk coating material, at the interface 28, and across bulk edge material 16, is uniformly equal to desired thickness 6. This is in contrast to FIG. 1, which shows a coating material 2 having an edge 8 that includes a relatively shallow taper.

The invention also contemplates coatings of all intermediate degrees of slope or taper, e.g., degrees of "squareness" of a coating material edge (possibly even an edge where the coating material edge slopes over the edge material edge, wherever this configuration might be useful). Different degrees of slope or different degrees of "squareness" or taper can be achieved by selecting coating techniques that increase the slope of a coating material edge, i.e., increase the steepness or squareness of the edge. These techniques are generally those techniques that work by causing edge material to act as a physical boundary against which the edge of the coating material forms. A first element of this embodiment can be the selection of materials or coating conditions that maintain a separation between the materials during and after coating, i.e., by selecting materials and coating conditions and coating techniques that cause the materials to be immiscible while coated. A second element can be the timing of the different coatings. Preferred results according to this embodiment can be achieved when the timing of coating the edge material relative to the timing of coating the coating material is not sufficient for an edge of either material to flow into the form of a taper. Preferred timing can cause edges of the different materials to contact each another either prior to, during, or soon after the moment or moments of their application to the substrate, so that the interface of the two materials at their edges cannot take the form of a taper, but instead, the materials abut each another at a fairly steep angle relative to the substrate.

Figure 5:
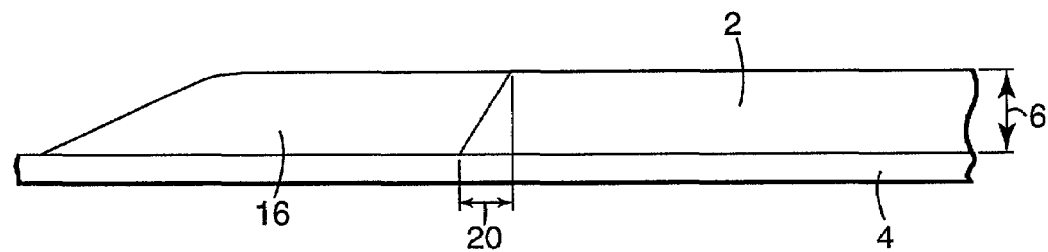
FIG. 5 is a side view illustration of a coating of coating material and edge material coated to an improved edge having a relatively steep slope and a relatively narrow width.
Figure 10:
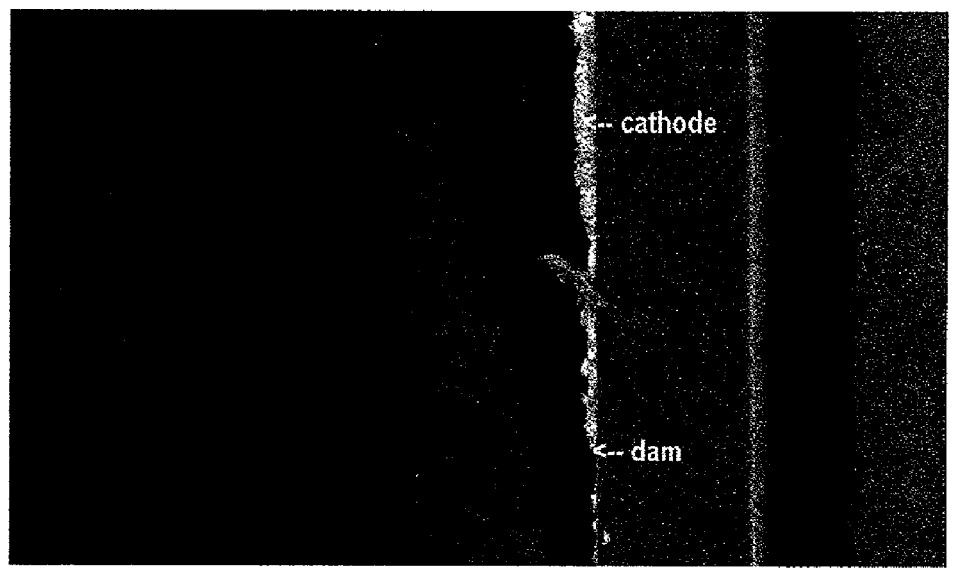
FIG. 10 is a scanning electron micrograph of a cross section of one of the coatings of example 1 illustrating the improved edge.
Figure 10:
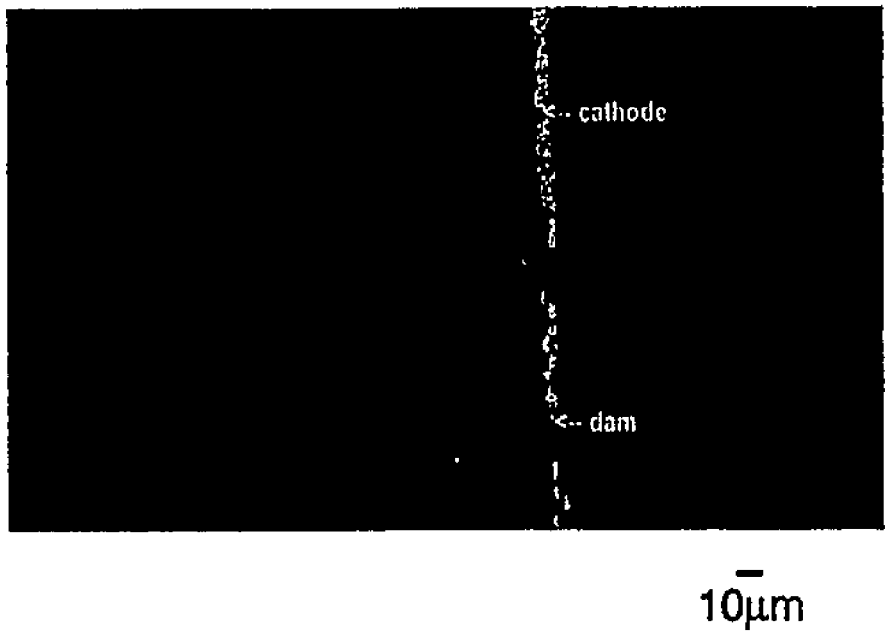

FIG. 5 illustrates an example of an intermediate degree of slope of a coating material edge. In FIG. 5, a coating material 2 is coated with and in contact with an edge material 16, e.g., from different orifices of a single coater head. The width 20 of the edge of coating material 2 can be less than a width of a coating material coated without an edge material, e.g., the width 20 of coating material 2 in FIG. 5 may be in the range of millimeters to fractions of millimeters, for example less than 1 mm, or 0.5 mm, e.g., 0.2 or 0.1 mm. An example of this is FIG. 10 where a 1–2 mm width in absence of edge material is reduced to 0.1–0.2 mm width with the edge material. In FIG. 10 the edge material is not visible in the SEM but the effect can be seen by the reduced taper of the coating material. As stated, particular methods can most closely approximate an idealized square edge, as shown in FIG. 4.

As discussed herein, timing of coating of an edge material and a coating material may with some techniques, ideally be simultaneous, which could technically mean that the two materials are coated from the same orifice, e.g., coater slot, or from different slots located exactly next to each other. The materials can be coated in a nearly simultaneous fashion if coated from two different orifices that are located very near each other and they are coated onto a substrate that is moving very quickly past the coater head. In this case, it is possible for the edge of the coating material to contact the edge of the edge material even before both materials contact the substrate. When preferred multi-slot die coating equipment is used, the slots can be as near as possible to each other, causing the timing difference to be minimal, and even causing the edge material to come into contact with the edge of the coating material at a point before either of the two materials comes into contact with the substrate. For example, some coater heads can place separate but substantially parallel slots at distances in the range from about less than 1 mm (thickness of center wedge) to about 5 mm. The same equipment can be used to coat a substrate traveling past the coater head at a speed in the range from about 3 to about 1000 feet per minute. The result is the nearly simultaneous application of the different materials from the coater head, with exemplary timing differences being significantly less than a second, e.g., in the range from about 0.001 to about 1.0 seconds.

The invention will be appreciated by the skilled artisan to be useful with a variety of different coating materials, edge materials, substrates, and possibly other components of individual product constructions that include a coated substrate.

The substrate can be any material that may be useful for a desired product construction, and upon which edge material and coating material can be coated. Examples of useful substrate materials include film or film-type materials that may include paper, polymeric materials such as polyethylene, polyester, polypropylene, silicone release liners, metallic foils and screens and other metals coated on paper or polymeric materials, any of which may be first coated with other useful materials, e.g., to affect a surface characteristic of the substrate such as surface tension, or such as with a primer to promote adhesive properties.

For some preferred battery constructions, useful substrates can include aluminum foil, copper foil and polymeric films such as polyester and others that will be appreciated by the skilled artisan. As known to those skilled in the art, the substrates should not react with the coated material.

The coating material and edge material can be any materials that can be coated into a preferably continuous and relatively uniform film on the surface of a substrate. Application areas include photographic, photothermographic, magnetic data storage, solvent adhesives, PSA adhesives, optical elements, fuel cells, as well as batteries. A particular example of a product construction that can benefit from the coating methods described herein are methods of producing certain electrochemical cells, such as batteries, for example batteries that include a stacked or rolled multilayer construction, for example, as is illustrated in U.S. Pat. No. 5,360,684, the entire disclosure of which is incorporated herein by reference.

When a method of the invention is used to construct an electrochemical cell, e.g., a battery, the coating material can be an electrode material such as a cathode material. Cathode materials are known in the art of batteries, and can be prepared from materials that are generally known and useful for electrodes or other components of an electrochemical cell. These can include an electrode active material, an electrically conductive material, an ionically conducting polymer, an electrolyte salt, and optionally a solvent.

The active material can be any of a variety of active materials known to be useful in electrodes, including oxide materials. The exact material used can be chosen based on various factors. As one example, the active material for use in lithium polymer batteries should be capable of storing lithium ion.

Examples of suitable active materials include $Li_xCoO_2$, $Li_xNiO_2$, Co-doped $Li_xNiO_2$, $Li_xMn_2O_4$, $Li_xMnO_2$, $V_2O_5$, $V_6O_{13}$, $Li_xV_3O_8$, $Ba_2SmNiO_5$, $SmMnO_3$, $Sm_3Fe_5O_{12}$, $EuFeO_3$, $EuFe_5O_{12}$, $EuMnO_3$, $LaNiO_3$, $La_2CoO_4$ and $LaMnO_3$ (including the charged and discharged forms of these materials. In primary batteries, the cathode can be fluorinated carbon, $SO_2Cl_2$, $Ag_2V_4O_{11}$, $Ag_2CrO_4$, $V_2O_5$, AgCl, $MoO_3$, FeS, CuS, sulfur, polysulfide, and an $O_2$ or $SO_2$ electrode. Particularly preferred electrode active materials include vanadium oxide and lithiated vanadium oxide. The amount of active material used can be any useful amount, as will be understood by one of ordinary skill.

Electrically conductive material can be included in the electrode to aid in electric conductivity of the electrode. Useful electrically-conductive materials are well known, and can include, for example, carbon, e.g., carbon black or graphite, lamp black, coke, carbon microbeads, carbon fibers, carbon flakes, copper powder, or other metal powders. The actual electrically-conductive material used in any particular electrode can be chosen based on various factors, such as the other materials of the electrode, or the electrochemical system. Often, carbon black or graphite are preferred. Useful amounts of the electrically conductive material will be understood by the skilled artisan, for any particular electrode, and can be any amount that aids in electronic conductivity of the electrode. An example of a useful amount of electrically-conductive material can be in the range from about 1 to about 10 weight percent electrically-conductive material, based on the total weight of all electrode components, excluding solvent.

An ionically conductive polymer is included as an electrode component as a binder to hold the electrode components together in the form of a functioning mass that is ionically conductive. The polymer can be chosen to provide desired adhesion and conductivity properties. The ionically conductive polymer may be a single type of polymer, or may be a mixture of two or more ionically conductive polymers. Or, the electrode may include a mixture of one or more ionically conductive polymer with another polymer that is not ionically conductive.

Ionically conductive polymers for use in electrode materials are well known and commercially available. One exemplary class of ionically conductive polymers is the class of polymers that are derivatives of monomers comprising an oxygen-containing monomer or a nitrogen-containing monomer. Preferred ionically conductive polymers are capable of conducting ions at room temperature, and are capable of dissociating alkali metal salts.

Examples of suitable ionically conductive polymers include: polyethers of the general formula

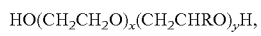

where
  x and y are mole fractions between 0 and 1, and x+y=1, and
  R is:
    a straight chain or branched alkyl group having the formula $C_nH_{2n+1}$ where n is 1 to 12;
    a straight chain or branched arylalkyl group having the formula $ArC_{n'}H_{2n'}$, where n' is 1 to 12 and Ar is an aromatic moiety (e.g. phenyl and naphthyl);
    an ethylenically unsaturated group having the formula $CHR'=C(R')ZC_{n''}H_{2n'''}$, where R' is H or methyl, Z, if present, is —O—, —S—, —SO—, —SO$_2$—, —NH—, —C(O)—, or —C(O)O—, and n" is 0 to 12; or,
    an oligoether of the general formula $R'(CHR'CH_2O)_n$, where R' and n are as defined above.

Other examples of useful ionically conductive polymers include polysiloxanes, polyphosphazenes, and polyacrylates.

One class of preferred ionically conductive polymers include polyalkylenoxide homopolymers or copolymers derived from monomers such as ethylene oxide, propylene oxide, butylene oxide, and allyl glycidyl ether. Such polymers are commercially available under such designations as DAP from Dai-Ichi-Cogyo Seiyaku, Japan and polyethyleneoxide available from Union Carbide under the designation Polyox. Examples of such ionically conductive polymers and their preparation are also described, for example, in U.S. Pat. No. 4,303,708, the entirety of which is incorporated herein by reference.

Useful amounts of ionically conductive polymer used in an electrode can be any amount that will act to bind the other ingredients into a useful electrode, as well as provide desired conductivity. Exemplary amounts may be, for example, in the range from about 10 to about 40 weight percent ionically conductive polymer, based on the total amount of all electrode components, more preferably from about 26 to about 32 weight percent.

Other polymers that are not ionically conductive may also be used in the electrode. Such polymer may be included to improve mechanical integrity or as a low cost binder. Examples include polyvinylidenefluoride (PVDF), polyacrylonitrile (PAN) and polyvinylpyrrolidinone (PVP), ethylene-propylene-diene (EPDM) terpolymer and emulsified styrene-butadiene rubber, among others. If non-ionically-conductive polymer is included in an electrode, it can be used in any amount that is useful, e.g., to provide a desired property, such as mechanical integrity, and is preferably included in an amount in the range from about 0 to about 50 percent by weight of the total weight of polymer (the total amount of ionically-conductive and non-ionically-conductive polymer).

The electrolyte salt is a highly dissociated salt capable of being dissolved in the ionically conductive polymer. For lithium polymer batteries, the salt is typically a lithium salt.

Electrolyte salts are well known in the arts relating to electrochemistry and electrochemical systems. Specific examples of preferred lithium salts are also well known and include lithium hexafluoroarsenate, lithium perchlorate, lithium hexafluorophosphate, lithium trifluoroborate, lithium trifluoromethanesulfonate, lithium bis(trifluoromethanesulfonyl)imide, lithium bis(perfluoroethanesulfonyl)imide, lithium tris(trifluoromethanesulfonyl)methide. See also Assignee's U.S. patent application Ser. Nos. 09/267,310 filed Mar. 12, 1999, now U.S. Pat. No. 6,280,883 and 09/139,315 filed Aug. 25, 1998, now U.S. Pat. No. 6,294,289 the disclosures of which are incorporated herein by reference. Particularly preferred are lithium hexafluorophosphate and lithium bis(trifluoromethanesulfonyl)imide.

The amount of electrolyte salt included in the electrode components should be enough to provide for a functioning electrode, e.g., to result in a sufficient level of ionic conductivity. Those of ordinary skill will appreciate amounts of the salt that will be useful in electrodes prepared by methods described herein. A useful amount for a particular electrode can depend on a variety of factors such as the particular salt chosen and the types and amounts of the other electrode components. While other amounts may be found to be useful, examples of useful amounts of electrolyte salt can be in the range from about 3 to about 15 weight percent based on the total weight of all electrode components, preferably from about 5 to about 10 weight percent.

Other optional ingredients may also be included in the electrode components, as will be understood by those of ordinary skill. These optional ingredients may include materials such as pore formers, surfactants, flow agents, antioxidants, and solvents. Exemplary solvents may include ethylene carbonate, propylene carbonate, dimethyl carbonate, diethyl carbonate, dimethyl adipate, tetramethylene sulfone, gamma-butyrolactone, dimethylformamide, dioctyl phthalate, tetrahydrofuran, polyethylene glycol dimethyl ether, polyethylene glycol, or combinations of these and other solvents.

The edge material can be any material that can be coated as described herein. The particular material used in a specific edge material can be selected to provide desired properties for a particular product construction. Moreover, properties of the edge material can be selected to interact well with the substrate and the coating material, for example to be coatable on the substrate and to be either coatable onto the coating material or immiscible with the coating material, to result in a desired thickness profile at the coating material edge, or to result in a desired shape of the coating material edge.

In some product constructions, such as an electrochemical cell, the edge material can be a non-active battery component, such as an insulating material, and can also or alternatively be chosen to act as a barrier to protect the coating material when the layers of the coated substrate are stacked or wound. Useful barrier materials may act as a barrier to air, to light, to water (any type of water including moisture in the air or aqueous water), or as a barrier to any other material or debris generally, as needed for particular product constructions. Additionally or alternatively, a preferred edge material can be electrically insulating, such as in the case of edge materials for batteries.

Some examples of edge materials can be coated in a solvent form, and later heated to remove the solvent. Alternatively, an edge material may be a coatable (e.g., film forming and extrudable) composition that could be chemically cured, thermoplastic, or thermoset, if desired.

As mentioned, the edge material, meaning the final form of the edge material after drying or curing, may perform some useful function in a product construction. For certain product constructions, therefore, some types of edge materials will not be appropriate. For example, certain product constructions would prefer a barrier material that takes the final form of a solid that is cohesive and not tacky or sticky, as would be a material that could be considered a pressure sensitive adhesive (PSA) or an elastomeric liquid. Thus, some embodiments of the invention include a barrier material that is neither a PSA nor an elastomeric liquid in its final form (e.g., after processing from a solution or otherwise).

Exemplary polymeric inactive materials may comprise an electrically insulating polymer such as polyurethane, polycarbonate, polyolefin, polyvinylether or a polyacrylate or poly(meth)acrylate, etc. Likewise, monomers such as isocyanate/(polyol or polyamine) or acrylates or oligomers may be coated and then heat or UV cured.

A substrate that has been coated as described with a coating material, an edge material, or both, can be processed in any desired fashion, to produce any desired product configuration. Examples of useful subsequent or intermediate processing steps might include additional coating steps; heating or cooling steps for affecting the coatings with temperature, e.g., for drying, solidifying, or curing, laminating, slitting, UV or electron beam curing, calendaring or any other processes that can be used to process coated films.

In electrochemical cell product configurations, processing of the coated substrate may include steps of introducing other components of the battery and then processing the combination into a battery cell. The additional components may generally include a separator layer, negative electrode, and negative electrode current collector. Those of skill in the battery arts will understand how such components can be incorporated with a substrate coated as described herein to produce an electrochemical cell. See, for example, U.S. Pat. No. 5,360,684 to Hydro-Quebec. e.g., at example 1, for description of a cell assembly process. In broad terms, a coated cathode or current collector may be laminated to an electrolyte film, followed by a lithium foil lamination and finally a polypropylene film. For a description of equipment useful for efficiently producing a stack of battery components according to the invention, see also Assignee's U.S. patent application Ser. No. 09/718,549, entitled "Stacking Apparatus and Method for Laminating Products and Packaging," filed Nov. 22, 2000, now U.S. Pat. No. 6,294,289 the entire disclosure of which is incorporated herein by reference.

The coated substrate can then be stacked or rolled to produce a layered stack of substrates coated with coating material (e.g., cathode material), edge material, and other optional layers useful in batteries. Most preferably, a coated substrate can be rolled into a wound roll, preferably using a large radius core. The wound roll can then be cut into pieces that can be laid into a relatively flat-layered component of convenient size for battery applications and further processed into a battery.

Figure 6A:
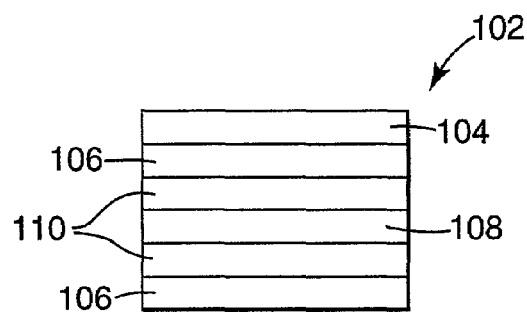
FIG. 6 is a set of illustrations of an exemplary battery component.

FIG. 6 shows an example of such a layered battery component. Referring to the FIG. 6a, which is a side view in one direction of a stacked battery component, the figure shows stacked battery component 102, that is made up of an anode layer 104, separator layers 106, a cathode current collector 108, and coated edge strips 110, which in this view conceal cathodes (see below). These layers can be prepared according to known methods and materials, and as described herein. For instance, anode layer 104 can include any type of materials useful in anodes such as lithium foil, lithium metal on a metal or plastic support, or other materials. Separator layers 106 may include a solid polymer electrolyte, a porous membrane, or other separator materials. Cathode current collector 108 may be prepared of materials known in the battery arts, such as aluminum, stainless steel or nickel and coated edge strips 110 can be an edge material as described supra.

Figure 6B:
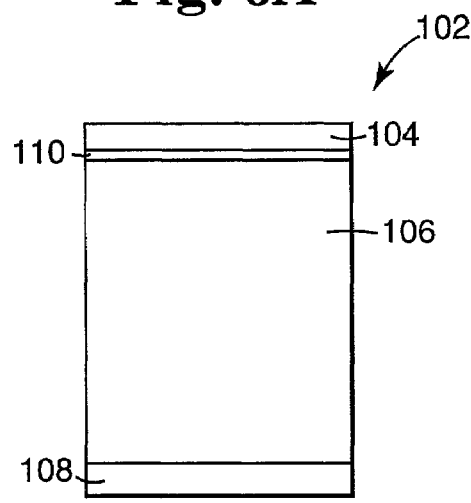

FIG. 6b shows stacked battery component 102 in a top view. From this view are visible only anode layer 104, a portion of an edge strip 110, current collector 108, which is visible at the other edge of the stacked battery component 102 (at the bottom of FIG. 6b), and the exterior separator 106.

Figure 6C:
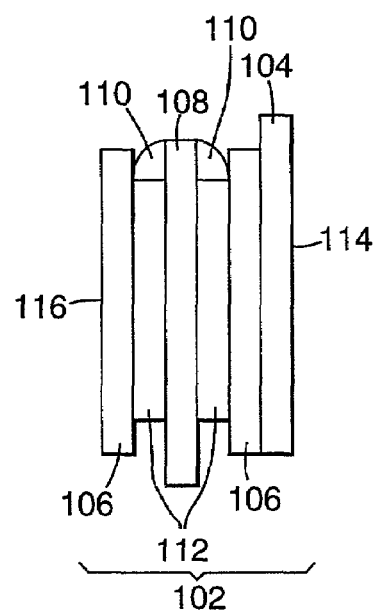

A view of the same stacked battery component 102 from a different side is shown in FIG. 6c. Starting from the right surface in the figure, FIG. 6c illustrates the structures of anode 104 being on an exterior surface, separated by a separator layer 106 from cathode 112. A first edge strip 110 contacts a coated edge of the cathode 112, and maintains a separation between separator 106 and anode 104, and one surface of current collector 108. The other surface of current collector 108 contacts a second cathode 112, also having an edge strip 110 coated at an edge of the cathode 112. The second edge strip 110 maintains a separation between the current collector 108 and a second separator 106. Referring still to side view 6c, multiple stacks can be placed adjacent to each other, by placing the exposed surface 114 of anode 104 in contact with an exposed surface 116 of an identical stacked battery component, in a wound or stacked configuration.

FIG. 6 illustrates how the edge of cathode 112 is covered by edge material 110, providing an insulating barrier between the cathode 110, anode 104, and current collector 108. Also apparent from FIG. 6 is the feature that the edge material can act as a barrier to protect and enclose the cathode 112 when the cathode is placed in a stacked configuration with other components of a battery. The edge material 110 may act as a barrier to light, moisture, water, or other materials.

Figure 9:
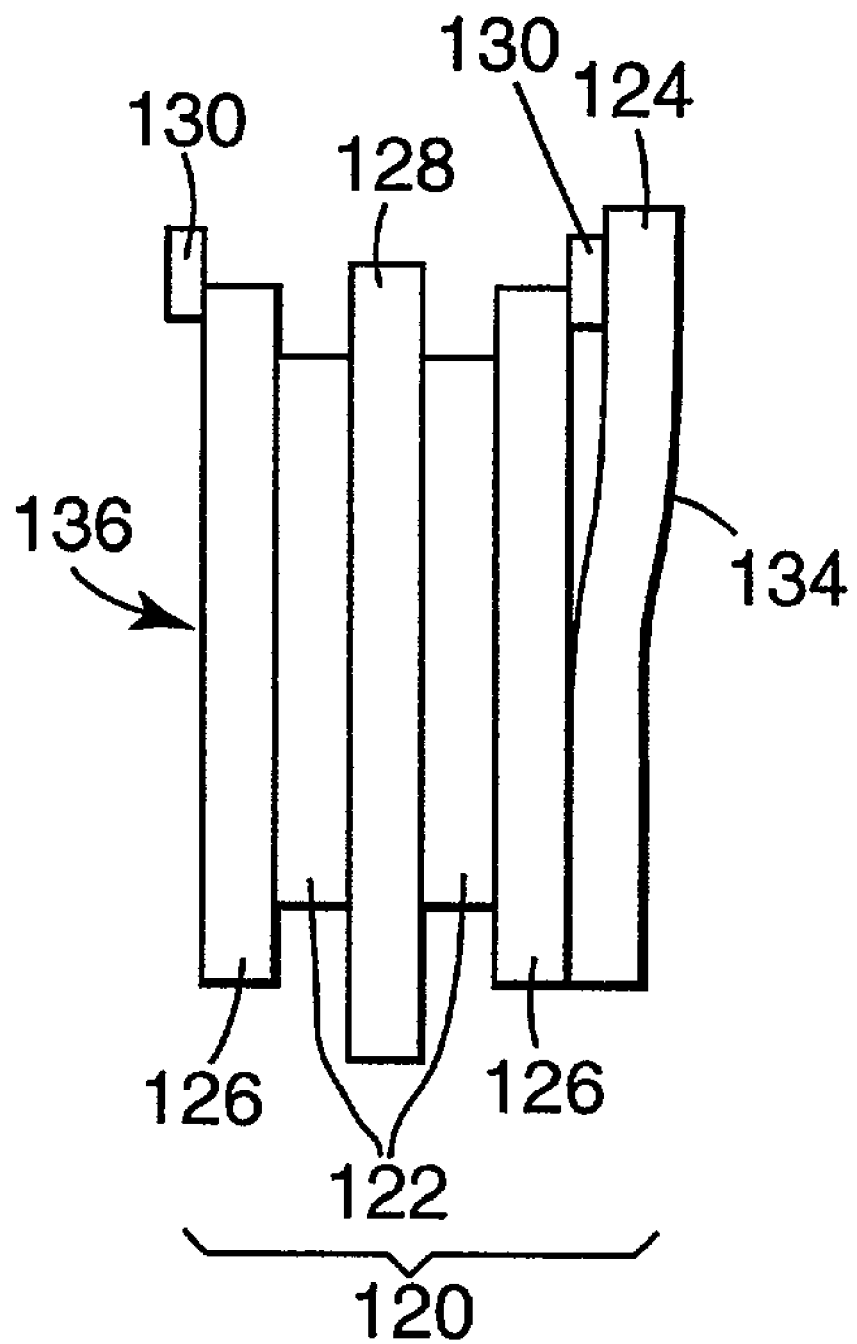
FIG. 9 illustrates a stacked battery component.

The stacked battery component 102 of FIG. 6 can be contrasted to a stacked battery component that does not use coated edge material as described herein. FIG. 9 illustrates such a battery component, 120, having anode 124 and insulating strip 130 at one end of anode 124, both in contact with a separator 126. The insulating strip prevents contact between the anode 124 and the current collector 128. A first cathode 122 is adjacent to the separator 126, which is adjacent to a current collector 128, which is in turn adjacent to a second cathode 122, next to a second separator 126. A second insulating strip 130 is on the other side of the second separator 126. The stacked battery component 120 can be placed adjacent to identical stacked battery components, by placing the exposed surface 134 of anode 124 in contact with an exposed surface 136 of second separator 126, of an identical stacked battery component, e.g., in a wound or stacked configuration. When so wound or stacked, the second insulating strip 130 acts to separate and insulate current collector 128 from anode 124.

In preferred processing methods of making battery cathodes or other materials, coating material and edge material can be stripe coated onto a substrate with improved manufacturing efficiencies. In general, alternating stripes of an edge material and coating material can be coated adjacent to each other, optionally with uncoated areas separating stripes of edge material.

Figure 7:
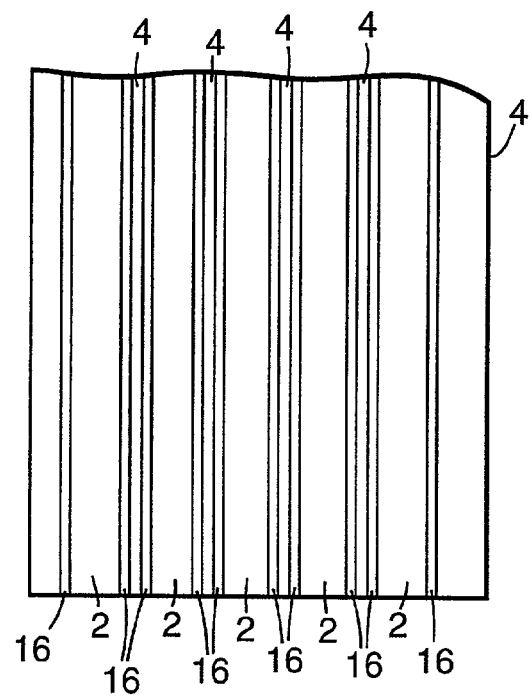
FIG. 7 illustrates a stripe-coated substrate.

One embodiment of a stripe-coated substrate is shown in FIG. 7. FIG. 7 shows substrate 4 and stripes of coating material 2 with edge material 16 coated at each edge of the coating material 2. The stripes of edge material are separated by uncoated stripes of exposed substrate 4, as indicated. Stripe-coating the substrate as illustrated can allow efficient production of multiple battery components from a single web. The stripe-coated substrate can be further processed as desired, for example to coat additional layers onto the stripe-coated materials, and by slitting, e.g., at the uncoated substrate between stripes.

Figure 8:
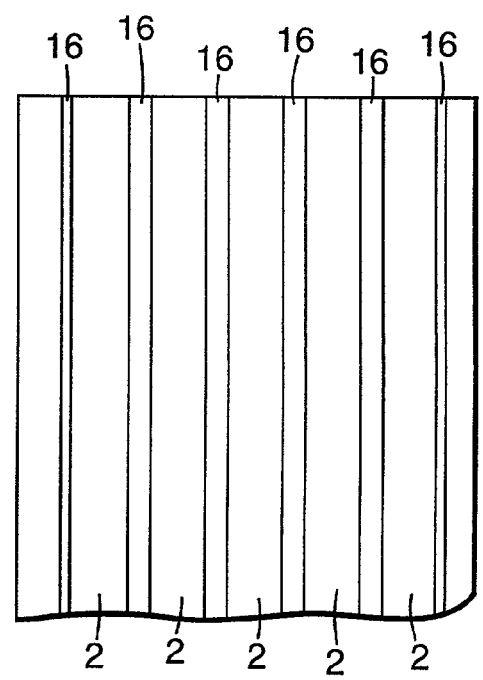
FIG. 8 illustrates another stripe-coated substrate.

Another embodiment of a stripe-coated substrate is shown in FIG. 8, which illustrates a similar stripe coated substrate, but without spaces between stripes of coated edge material. In FIG. 8, a substrate is coated with alternating stripes of cathode material 2 and edge material 16. This embodiment has advantages that are similar to the those described with respect to the coated substrate of FIG. 7, but differs in that slitting will be along a stripe of the coated edge material 16.

EXAMPLE 1

A die (as described in WO95/29763 and additionally illustrated in FIG. 2b) with 2 cavities was used to coat edge barrier strips on either side of a primary coating in a continuous manner. Coatings were placed onto a 1.4 mm polyester backing.

Shims for each slot of a dual slot coater (as designated in FIG. 2b) were prepared so that openings allowed an edge of a non-active edge material to align with an edge of a cathode material (in this case active) coating to be delivered separately to the web via each of the two slots. The two coatings were coated in different orders in producing different samples, sometimes the cathode material being coated first and sometimes the edge material being coated first.

For the edge material, 21% (w/w) polyethyleoxide (Polyox WSR-N-80 MW 200.000, Union Carbide) was mixed with a solvent blend of 80% acetonitrile and 20% toluene (w/w).

For the coating (in tbis case cathode) material, the following composition, 30% w/w in 80:20 acetonitrile/toluene, was fed through slot in the die (slot spacing as defined by shim thicknesses was 0.007–0.020 inches (sharp center die wedge)): 62% w/w $LiV_3O_g$ (3M). 29% w/w ethylene oxide/propylene oxide/allyl glycidyl ether copolymer ("DAP", Dai-Ichi-Cogyo Seiyako, Japan), 3% w/w/ Ketchenblack EC600JD carbon black (Akzo Nobel, Chicago, Ill.), 6% w/w lithium bis(trifluoromethanesulfonyl)imide salt(3M).

Samples of 43 different coating conditions were generated. The conditions included:

| | |
|---|---|
| coating vacuum | 0–1 inches of H2O |
| over bite | 0–0.003 inches |
| coating gap | 0.010–0.020 inches |
| 1st slot pump | 10–70.5 rpm |
| 2nd slot pump | 0–70.5, rpm |
| shim offset | 0–0.0625 inches |
| web speed | 25 fpm |
| web caliper | 0.002 inches |
| coat width | 3.5 inches |
| strip width | 2 @ 0.25 inches |
| vacuum gap | 0.006 inches |
| slot heights | 0.02 inches. |

SEMs were taken of several samples with both planar and cross-sectional views. FIG. 10 illustrates a cross sectional view showing an improved edge. Although the edge material is not visible in the SEM (magnification 400×) the inventive effect can be seen by the reduced edge width (0.1–0.2 mm vs. 1–2 mm without the edge material). The edge tapers from a bulk thickness at the point designated "cathode" down to a thickness of zero at the point designated "dam." The large flake near the midpoint of the coating material edge is debris.

EXAMPLE 2

Alternating stripes of Indicator Composition B ("indicator stripe") at 38% solids and Barrier PSA Composition ("PSA stripe") at 39% solids were coated onto an untreated, low-haze, 1.4-mil polyester PET transparent film backing using an extrusion die. The basic die is as described in WO95/29763 with two separate manifolds and slots for supplying the Composition B (Bottom Manifold) and the Barrier PSA (Top Manifold). A precision gear pump was used to supply the PSA composition to the top manifold and another precision gear pump was used to supply the indicator composition to the bottom manifold. Each pump could be adjusted independently to control flow rate of the compositions to the die. The pump flow rates were set for 2.6 mil wet for the indicator stripe, and 2.9 mil wet for the Barrier PSA Edge. An arrangement of shims allowed distribution and delivery of the Barrier PSA Edge material (1 inch width) adjacent to the Indicator Composition B material (0.5 inch width). Different width, spacing, and registration of the edge stripes and center could be achieved by machining new slot shims for each manifold section. The die was mounted in an assembly on a precision die mount that allowed for adjustment of the engagement of the die with the web on the back-up roll.

The striped coating was dried using a forced air oven located directly after the die station to provide a dry coating thickness of about 25 microns. Samples were coated with minimal transition disturbance zone between the adjacent barrier edge and indicator stripe.

EXAMPLE 3

Thin film coatings can be prepared by essentially solventless extrusion of mixtures of solid ingredients. The ingredients are intimately mixed by a variety of methods and melted and compressed through a flat orifice to produce a thin coating on a substrate.

A cathode containing an active material such as $V_2O_5$, electrically conductivity material such as carbon black, an electrolyte salt such as lithium trifluoromethanesulfate, and an ionically conductive polymer binder such as polyethylene oxide would be mixed in proportions similar to example #1 but with no solvent or liquid add. The mixture would be fed to a single screw extruder with a temperature sufficient to melt the polymer binder. The mixture would be pumped under pressure by the internal action of the extruder to a flat exit orifice. The melted mixture would be formed and cooled on a web moving past the orifice.

A second mixture would be prepared from a polymer or monomer binder. The binder may contain additional ingredients to aid hardening of the binder when subjected to light, irradiation or heat, to aid in flow characteristics and other modifications for final characteristics. This second mixture would be extruded or pumped under pressure with the flow stream split into two parts. Each of the parts is pumped through an orifice that modifies the shape of flow and places the flow next to the edge of the coated cathode thin film.

The placement of the edge flow can occur just prior to the cathode film forming, oriented to be simultaneous or nearly simultaneous with the cathode film forming, or just after the cathode film forming. The transition interface between the edge coating and cathode film is a function of the material characteristics, orifice geometry, and placement of each of the orifices.

The invention claimed is:

1. A method of coating a substrate with a cathode material for an electrochemical cell, the method comprising
   providing a substrate selected from the group consisting of a paper substrate, a metallic foil substrate, a release liner, a metal coated paper, and a metal coated polymer,
   coating edge material onto the substrate to contact a surface of the substrate, and
   coating cathode material onto the substrate to contact a surface of the substrate,
   wherein the cathode material and the edge material contact each other, and
   wherein the thickness profile at the edge of the coated cathode material is improved relative to a thickness profile of an edge of a cathode material coated without the edge material.

2. The method of claim 1 wherein the coated cathode material comprises a tapered edge, and edge material is coated to at least partially cover the tapered edge to produce a desired dry thickness profile at the tapered cathode material edge based on the combined dry thickness of cathode material and edge material.

3. The method of claim 2 wherein a bulk portion of cathode material is coated to a desired dry thickness, and the thickness profile at the cathode material edge comprises a substantially uniform dry thickness that approximates the desired dry thickness of the cathode material to within 10 percent.

4. The method of claim 1 comprising coating the cathode material and the edge material onto the substrate using a die coater having a first slot for coating cathode material and a second slot for coating edge material in contact with an edge of the cathode material.

5. The method of claim 1 wherein edge material acts as a physical boundary against which cathode material forms an edge.

6. The method of claim 5 wherein the edge material and the cathode material maintain a separation after being coated onto the substrate.

7. The method of claim 5 wherein the edge material and the cathode material are immiscible.

8. The method of claim 5 wherein the physical boundary of edge material alters the shape of the edge of the cathode material relative to the shape of a cathode material edge of a cathode material coated absent edge material.

9. The method of claim 5 wherein
   a bulk portion of cathode material is coated to a dry thickness in the range from about 3 to about 100 microns, and
   a width of the edge of the coated cathode material is in the range from about 0.1 to about 3 mm.

10. The method of claim 5 comprising coating cathode material and edge material onto a substrate using a die coater having a first slot for coating cathode material and a second slot for coating edge material, wherein shims are arranged in each slot to cause a stripe of edge material to be coated adjacent to a stripe of cathode material, on a moving substrate.

11. The method of claim 10 wherein the first slot and the second slot are substantially parallel and are separated by a distance of less than about 5 millimeters.

12. The method of claim 11 wherein the edge material and the cathode material are coated onto a substrate moving past the slots at a rate in the range from about 3 to 1000 feet per minute.

13. The method of claim 5 wherein the edge material and cathode material are coated nearly simultaneously.

14. The method of claim 5 wherein an edge of the cathode material and an edge of the edge material come into contact with each other before the edges of the materials contact the substrate.

15. The method of claim 14 comprising nearly simultaneously coating the cathode material and edge material onto a substrate using a single die coater with multiple orifices.

16. The method of claim 5 wherein the cathode material edge is approximately square, having a uniform thickness profile, and a width of less than a millimeter.

17. The method of claim 1 comprising extrusion coating a cathode material onto a substrate, calendering the cathode material, and extrusion coating an electrically insulating edge material in contact with an edge of the calendered cathode material.

18. The method of claim 17 wherein the electrically insulating edge material is coated using a hot melt extrusion process.

19. The method of claim 17 wherein the electrically insulating polymer is chosen from the group consisting of a polyurethane, a polycarbonate, a polyolefin, a polyvinylether, an isocyanate, a polypropylene, a polyethylene, a polyacrylate, and combinations thereof.

20. The method of claim 1 wherein the cathode material comprises an electrode active material, an electrically conductive material, an ionically conducting polymer, and an electrolyte salt.

21. The method of claim 1 wherein the coating material is extrusion coated onto the substrate.

22. The method of claim 1 wherein the edge material is extrusion coated onto the substrate.

23. The method of claim 1 wherein the coating material is solvent coated onto the substrate.

24. The method of claim 1 wherein the edge material is solvent coated onto the substrate.

25. A method of coating a substrate with a cathode material for an electrochemical cell, the method comprising providing a substrate, coating a cathode material onto the substrate to contact a surface of the substrate, and coating an insulating edge material onto the substrate to contact a surface of the substrate, the edge material also being a barrier material, coating a separator layer comprising solid polymer electrolyte, in contact with the cathode material, wherein the cathode material and the edge material contact each other.

26. The method of claim 25 wherein the cathode material is extrusion coated.

27. The method of claim 25 wherein the edge material is extrusion coated.

28. The method of claim 25 wherein the wet coating thickness of the edge material is approximately equal to the wet coating thickness of the cathode material.

29. The method of claim 25 wherein the dry coating thickness of the edge material is approximately equal to the dry coating thickness of the cathode material.

30. The method of claim 1 wherein the substrate is selected from the group consisting of a metallic foil and a release liner.

31. The method of claim 1 wherein the substrate is selected from the group consisting of aluminum foil, copper foil, and a silicone release liner.

* * * * *

UNITED STATES PATENT AND TRADEMARK OFFICE
CERTIFICATE OF CORRECTION

PATENT NO.        : 7,097,673 B2                                      Page 1 of 2
APPLICATION NO. : 09/876567
DATED             : August 29, 2006
INVENTOR(S)       : William R. Dudley It is certified that error appears in the above-identified patent and that said Letters Patent is hereby corrected as shown below:

Drawings
Sheet 8 of 8, Fig. 10, delete "10μm" and insert --10μm--
Replace Sheet 8 of 8 with the attached Sheet 8/8

Column 13
Line 42, after "$ArC_{n'}H2_{n'}$" delete ","
Line 55, delete "polyalkylenoxide" and insert --polyalkyleneoxide--

Column 17
Line 37, after "to" delete "the"
Line 61, delete "tbis" and insert --this--
Line 63, after "through" insert --a--
Line 65, delete "$LiV_3O_g$" and insert --$LiV_3O_8$--
Line 65, after "(3M)" delete "." and insert --,--
Line 67, delete "Seiyako" and insert --Seiyaku--
Line 67, delete "w/w/" and insert --w/w--

Column 18
Line 7, delete "H2O" and insert --$H_2O$--
Line 26, delete "dam."The" and insert --"dam". The--

Signed and Sealed this

Fifteenth Day of May, 2007

JON W. DUDAS
*Director of the United States Patent and Trademark Office*